Aug. 16, 1932.   S. C. WINGER   1,872,205
QUICK ACTING MECHANISM
Filed March 10, 1931
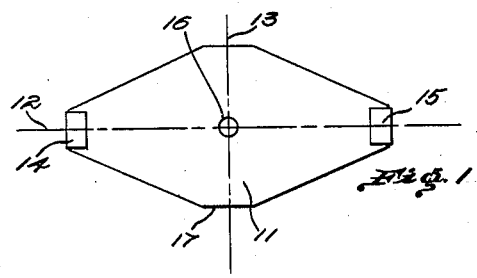
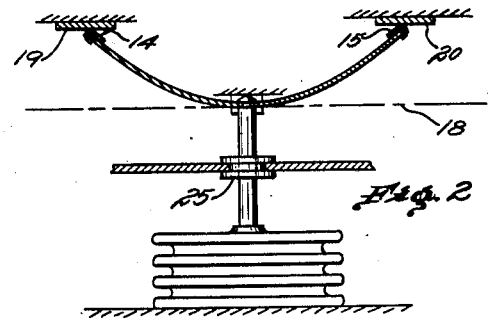
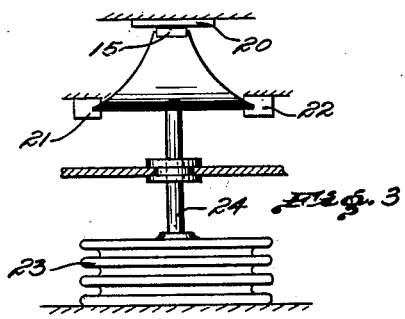
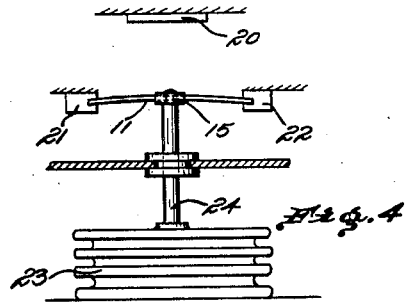
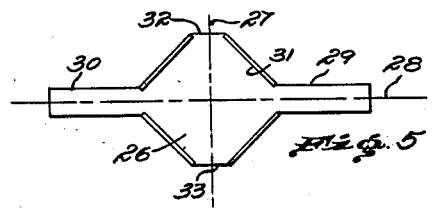
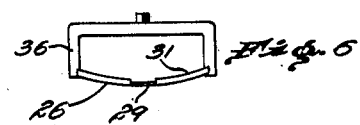
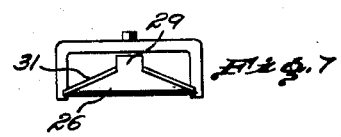
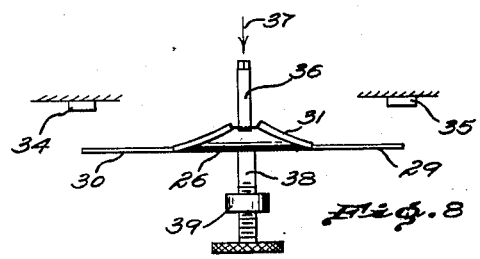
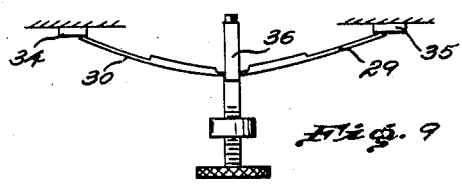
Inventor
Stover C. Winger
by John Flam
Attorney Patented Aug. 16, 1932

1,872,205

UNITED STATES PATENT OFFICE

STOVER C. WINGER, OF LOS ANGELES, CALIFORNIA

QUICK ACTING MECHANISM

Application filed March 10, 1931. Serial No. 521,423.

This invention relates to a quick acting mechanism, and more particularly to one that is arranged to snap over into either of two positions, thereby performing a control function, for opening or closing a circuit.

It is now quite common to utilize various spring actuated mechanisms for effecting this result, as, for example, in the usual snap switch. However, such devices require careful designing and are complicated. They include small parts that are difficult to assemble or to replace when necessary.

With the aid of my invention, I overcome all these disadvantages, by providing a simple, compact and sturdy device having few parts. The device can be actuated manually or automatically in response to operating conditions such as temperature or pressure.

I am enabled to accomplish these results by the use of a resilient metallic member that is so arranged that its configuration changes suddenly or discontinuously upon a force being applied to it. The member is so designed that contacts or other control devices carried at one or both extremities are given a quick motion. This effect can be secured, for example, by giving the resilient member a definite strain or contour to which it tends to return, but from which it can be "kicked" out to produce a snap action; or, in another form, a force is needed to change the contour suddenly from one form to another.

My invention possesses many other advantages, and has other objects which may be made more easily apparent from a consideration of several embodiments of my invention. For this purpose I have shown a few forms in the drawing accompanying and forming part of the present specification. I shall now proceed to described these forms in detail, which illustrate the general principles of my invention; but it is to be understood that this detailed description is not to be taken in a limiting sense, since the scope of my invention is best defined by the appended claims.

Referring to the drawing:

Figure 1 is a diagrammatic plan view of a resilient element that forms the main member of my control device;

Fig. 2 is a diagrammatic representation of a switch mechanism embodying the invention, the switch being shown in closed position, and merely as one form in which my invention can be used;

Fig. 3 is a side elevation of the device shown in Fig. 2;

Fig. 4 is a view similar to Fig. 3, but with the switch open;

Fig. 5 is a diagrammatic plan view of a resilient element of modified form, which can be used in place of that shown in Fig. 1;

Fig. 6 is a side elevation of the member shown in Fig. 5, together with an actuating member;

Fig. 7 is a side elevation of the same member shown in the other stable position as compared with Fig. 6;

Fig. 8 is a diagram of a switch mechanism incorporating the member shown in Fig. 5, the switch being open; and Fig. 9 is a view similar to Fig. 8, but with the switch closed.

In order to understand the snap action, I have shown the main element 11 of the mechanism in Fig. 1. This member is made from thin resilient material, such as spring steel, phosphor bronze or the like, and can be considered to have two mutually perpendicular axes 12 and 13. Along one axis can be placed one or more contacts, such as 14, 15; and an actuating means can be attached to the member 11 at the intersection of the axes 12, 13, as by the aid of an aperture 16.

Now let us assume that the member 11 is bent to give it a permanent strain, the bending taking place along a line parallel to axis 13. In other words, the member 11 would be bent as shown in Fig. 2. This bent form represents a stable position to which the member 11 tends to return. The movement of the extremities of the member 11 can be accomplished by counteracting this set or strain. For example, edges 16, 17 of the member 11 can be anchored near the axis 13, and a force applied near the intersection of the two axes 12 and 13 in an upward direction as viewed in Fig. 2. Then the tendency is to bend the member 11 along an axis parallel to axis 12; and this causes the member 11 to straighten out in general along the direction of line 18, Fig. 2.

When this force is sufficient, the strain along axis 13 is suddenly and abruptly removed, and a strain is put into the member along the other axis 12.

As soon as the force is removed, the member 11 returns to its stable, set position of Fig. 2, with a quick action. The movements of the contacts 14, 15 can be used to control an electric circuit, in a manner now to be described.

In Fig. 2 there are shown a pair of stationary contacts 19, 20, with which cooperate the contacts 14, 15. Anchors 21, 22 are used to hold the edges 16, 17 of member 11 stationary near the axis 13, as by providing a groove for the accommodation of the edges. In the present instance, the flexure of member 11 along axis 12 can be accomplished automatically in response to pressure or temperature; a sylphon or expansible bellows 23 is shown for this purpose. This sylphon can be arranged to expand and contract in accordance with temperature or pressure variations, and to move a stem 24 axially in a stationary guide 25. This stem can be fastened to member 11 at aperture 16, at the intersection of the axes 12 and 13.

As soon as stem 24 raises to produce a pronounced flexure along axis 12, the contact carrying extremities of member 11 snap downwardly, causing the contacts 14, 15 to separate from contacts 19, 20. Before separation, a rubbing action occurs between the contacts, due to the upward force exerted by the sylphon. This rubbing action is highly desirable as it keeps the contact surfaces clean.

Fig. 4 shows how the bowing or flexure of the member 11 along a central longitudinal axis will bring the contacts down. As soon as this flexure is released, the contacts spring up again to the position of Fig. 3.

In Figs. 5, 6, 7, 8, and 9, I disclose a modified form of operating member 26. This member is also made from flat spring material, having two mutually perpendicular axes 27, 28. Along axis 28 it has two extended arms 29, 30 that can act as contact arms. Furthermore, to lend rigidity to the edges of the main portion of the member 26, flanges 31 can be formed by turning up the material.

Let us now assume that a permanent strain is put into the member 26 along axis 28 so as to cause it to assume a stable bowed shape shown in Fig. 6. Then if the same kind of a permanent strain is placed along axis 27, another stable bowed shape is possible, such as indicated in Fig. 9. These two stable positions can be produced at will, by appropriate flexing forces.

For example, if member 26 be in the stable position of Figs. 6 and 8, the other stable position, shown in Figs. 7 and 9, can be obtained by a force urging the member 26 to be straightened along axis 27. Thus a force applied against edges 32, 33 can accomplish this result. The member 26 will snap into the other of its two stable positions as shown in Figs. 7, and 9, and contact arms 29, 30 will move correspondingly as shown by comparing Figs. 8 and 9.

This movement can be accomplished for switching purposes as disclosed in Figs. 8 and 9. In these figures, stationary contacts 34, 35 are arranged to coact with arms 29, 30. A yoke 36 (Figs. 6, 8 and 9) engages edges 32, 33 and can be moved to produce the desired flexing of the member 26. This yoke can be actuated automatically in response to definite conditions or manually. For example, yoke 36 can be moved downwardly as indicated by the arrow 37 in Fig. 8, to actuate the arms 29, 30. The member 26 contacts at its bottom with an adjustable abutment 38, formed by a screw threaded in a stationary member 39. As yoke 36 moves downwardly, the strain of the member 26 along axis 27 is produced, causing the member to snap up to the position of Fig. 9. The contacts are in engagement.

Now if in the position of Fig. 9, yoke 36 is moved upwardly, the first action is a rubbing action between contact arms 29, 30 and their respective stationary contacts 35, 34. Then on continued motion, there is an increasing force tending to bend member 26 on axis 28; and finally, the bend or strain on axis 27 disappears and the member 26 snaps into the bend or strain axis 28. This produces a condition shown in Fig. 8, the contacts being open.

It is thus apparent that in this form, the member 26 has portions which cooperate with stops to permit the resilient forces to be exerted. In the downward movement of yoke 36, the stop is formed by abutment 38 acting at the intersection of the axes 27, 28; and in the upward movement of yoke 36, the stop is formed by stationary contacts 34, 35 acting on contact arms 29, 30.

In both forms, strains are produced or counteracted along definite axes such as 12, 13 or 27, 28 to secure the snap action by a movement of the resilient member which is discontinuous with respect to the applied forces.

I claim:

1. In a device of the character described, a resilient member having a stable set along each of a number of intersecting axes, and means operating on said member to reduce the set along one axis and thereby increase it along another axis to make the member assume another of its stable sets.

2. In a device of the character described, a resilient member having a stable set along each of a number of intersecting axes, and means for applying a force to reduce the set along one axis and increase it along another axis to make the member assume another of its stable sets.

3. In a device of the character described, a resilient member having a stable set along each of a number of intersecting axes, and means for applying a force to reduce the stable set on one axis and thereby increase it on another axis.

4. In a device of the character described, a resilient member having a stable set along each of a number of intersecting axes, means engaging the edges of the member adjacent the said one axis, to control the set along that axis, and an abutment for the member against which said means can act.

5. In a device of the character described, a resilient member having a stable set along each of a pair of transverse axes, means for controlling the set along one of said axes, said means engaging the edges of the member adjacent said axis, and an abutment for engaging the member intermediate said edges, whereby movement of said controlling means in one direction will urge the member toward the abutment.

6. In a device of the character described, a resilient member having a stable set along an axis, and means for producing a quick or discontinuous movement or strain along this axis, comprising means exerting a force to produce a strain along another axis transverse to the first axis.

In testimony whereof, I have subscribed my name.

STOVER C. WINGER.